(12) United States Patent
Fujita

(10) Patent No.: US 8,049,804 B2
(45) Date of Patent: Nov. 1, 2011

(54) LENS DRIVING DEVICE AND IMAGING DEVICE

(75) Inventor: Hideaki Fujita, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

(21) Appl. No.: 12/227,328

(22) PCT Filed: May 8, 2007

(86) PCT No.: PCT/JP2007/059491
§ 371 (c)(1),
(2), (4) Date: Feb. 18, 2009

(87) PCT Pub. No.: WO2007/135854
PCT Pub. Date: Nov. 29, 2007

(65) Prior Publication Data
US 2009/0207300 A1      Aug. 20, 2009

(30) Foreign Application Priority Data
May 19, 2006   (JP) .................................. 2006-139991

(51) Int. Cl.
*G02B 13/16* (2006.01)
*H04N 5/225* (2006.01)
(52) U.S. Cl. ......... 348/335; 348/340; 348/345; 348/348
(58) Field of Classification Search .................. 348/335, 348/340, 345, 348, 372–376
See application file for complete search history.

(56) References Cited

U.S. PATENT DOCUMENTS

| | | |
|---|---|---|
| 6,650,488 B2 | 11/2003 | Onda |
| 2002/0135886 A1* | 9/2002 | Onda .............................. 359/694 |
| 2002/0141081 A1 | 10/2002 | Onda |
| 2003/0107667 A1 | 6/2003 | Abe et al. |
| 2005/0180025 A1* | 8/2005 | Orimo et al. ................... 359/694 |
| 2006/0018037 A1* | 1/2006 | Okuda ........................... 359/694 |

FOREIGN PATENT DOCUMENTS

| | | |
|---|---|---|
| JP | 05-107438 A | 4/1993 |
| JP | 05-134159 A | 5/1993 |
| JP | 10-020177 A | 1/1998 |
| JP | 2000-206391 A | 7/2000 |
| JP | 2002-214505 A | 7/2002 |
| JP | 2002-296480 A | 10/2002 |
| JP | 2003-222935 A | 8/2003 |
| JP | 2005-043733 A | 2/2005 |
| JP | 2006-078955 A | 3/2006 |
| JP | 2007-101634 A | 4/2007 |

\* cited by examiner

*Primary Examiner* — Yogesh Aggarwal
(74) *Attorney, Agent, or Firm* — Edwards Angell Palmer & Dodge LLP; David G. Conlin; David A. Tucker

(57) ABSTRACT

A contact portion 9 of a lens holding frame 1 and a contact portion 8 of a nut 10 are so formed that when the lens holding frame 1 and the nut 10 are brought into contact with each other by a coil spring 12, an urging force acts on the lens holding frame 1 in an optical axis direction and an orthogonal direction that orthogonally intersects the optical axis direction.

8 Claims, 10 Drawing Sheets

LENS DRIVING DEVICE AND IMAGING DEVICE

TECHNICAL FIELD

The present invention relates to a lens driving device for driving a lens to be used in optical instruments and the like, as well as to an imaging device such as cameras having the lens driving device.

BACKGROUND ART

Conventionally, an imaging device such as a camera has an image pickup optical system composed of a plurality of lenses and image sensors such as charge coupled devices (CCDs) placed at specified positions, in which arrangement a subject image to be formed based on a light pencil incident on the image pickup optical system is formed by the image sensors.

In this type of imaging device, for autofocus function and zoom function, a lens driving device for moving the lens in an optical axis direction is used. In this lens driving device, generally, by rotating a lead screw with use of a stepping motor or the like as a driving source, a lens holding frame is moved in the optical axis direction via a nut having a female screw portion engaged with the lead screw.

In such a lens driving device, the lens holding frame and the nut are fitted to each other, or thrust into contact (urged) against each other with aid of a reaction force (preload) of a spring material, so as to allow individual components involved to smoothly operate, by which backlashes that occur to the lens holding frame in the optical axis direction (thrust direction) are absorbed.

Also in an orthogonal direction (radial direction) that orthogonally intersects the optical axis direction, there occur backlashes due to clearances of components between the guide shaft and the bearing of the lens holding frame, as well as between the lead screw and the nut. Therefore, another spring material is used to apply the urgency in the radial direction as well (JP 2000-206391 A).

On the other hand, there has been known an imaging device in which a mechanical shutter for adjusting light quantity in response to the brightness of the subject is fixed to a lens holding frame so that the mechanical shutter is moved integrally with the lens holding frame (JP H5-134159 A).

In such an imaging device, a flexible printed circuit (FPC) board for controlling the opening and closing of the mechanical shutter changes in configuration along with the movement of the lens holding frame, causing a reaction force of the configuration change to act on the lens holding frame.

DISCLOSURE OF THE INVENTION

Unfortunately, in the lens driving device disclosed in JP 2000-206391 A, two urging springs are used for prevention of backlashes in two directions, the thrust direction and the radial direction, causing the device structure to be complex and making it difficult to reduce the device size, and moreover leading to a cost increase due to increased parts count.

Further, in the imaging device disclosed in JP H5-134159 A, as the FPC changes in configuration with movement of the lens holding frame, reaction force given from the FPC to the lens holding frame fluctuates. Upon occurrence of such fluctuations of the reaction force, the lens holding frame is pushed (or pulled) by the FPC, resulting in occurrence of a backlash of the lens holding frame corresponding to the backlash between the bearing of the lens holding frame and the guide shaft, and moreover leading to occurrence of a tilt of the lens in the radial direction.

Accordingly, an object of the present invention is to provide a lens driving device and an imaging device both capable of moving the lens with high accuracy and moreover achieving size reduction and cost reduction.

In order to achieve the objects, the lens driving device in this invention comprising:

a lens holding frame for holding a lens;

a guide shaft for guiding the lens holding frame in an optical axis direction;

a lead screw which is rotated by a driving source;

a nut which is engaged with the lead screw to transmit driving force of the driving source to the lens holding frame so that the lens holding frame is moved in the optical axis direction; and an urging member for urging the lens holding frame toward the nut so that the lens holding frame is put into contact with the nut, wherein mutual contact portions of the lens holding frame and the nut are so formed that when the lens holding frame and the nut are brought into contact with each other by the urging member, an urging force acts on the lens holding frame in the optical axis direction and in an orthogonal direction that orthogonally intersects the optical axis direction.

In this lens driving device of this invention, the mutual contact portions of the lens holding frame and the nut are so formed that when the lens holding frame and the nut are brought into contact with each other by the urging member, an urging force acts on the lens holding frame in the optical axis direction and the orthogonal direction. Therefore, a preload can be given to the lens holding frame in both the optical axis direction (thrust direction) and the orthogonal direction (radial direction) by the single urging member, so that backlashes of the lens holding frame and lens tilts due to the drive of the lens holding frame can be suppressed. Also, the lens driving device can be simplified in construction, allowing reduction of the parts count, size reduction and cost reduction to be achieved. Moreover, since backlashes of the lens holding frame can be reduced, driving noise can be reduced.

Moreover, in the lens driving device of one embodiment, at least one of the contact portion of the lens holding frame and the contact portion of the nut has a sloped surface sloped with respect to an orthogonal plane that orthogonally intersects the optical axis direction.

In the lens driving device of this embodiment, since at least one of the contact portion of the lens holding frame and the contact portion of the nut has the sloped surface sloped with respect to the orthogonal plane, the sloped surface is formed so as to be directed toward the optical axis direction and the orthogonal direction and a preload can be given to the lens holding frame in both the optical axis direction and the orthogonal direction by the sloped surface. Thus, backlashes of the lens holding frame and lens tilts can be suppressed with an even simpler construction.

Moreover, in the lens driving device of one embodiment, the contact portion of the nut is present within a central angle range of 180° about an axis of the nut assumed as the center.

In the lens driving device of this embodiment, since the contact portion of the nut is present within a central angle range of 180° about the axis of the nut assumed as the center, a preload can be given to the lens holding frame in both the optical axis direction and the orthogonal direction by the contact portion of the nut. Thus, backlashes of the lens holding frame and lens tilts can be suppressed with an even simpler construction.

Moreover, in the lens driving device of one embodiment, the urging member is a coil spring, and an inner diameter portion of the coil spring is insertionally fitted to the guide shaft.

In the lens driving device of this embodiment, the urging member is a coil spring whose inner diameter portion is insertionally fitted to the guide shaft. Therefore, with the inner diameter portion of the coil spring insertionally fitted to the guide shaft, the coil spring can be set up in a small space, and prevented from being released off due to dropping or other shocks. Also, since the coil spring gives the preload to the lens holding frame at a proximity to the guide shaft, the moment can be reduced, so that the lens holding frame can be driven with low torque.

Moreover, in the lens driving device of one embodiment, the lens holding frame and the nut are formed from resin.

In the lens driving device of this embodiment, since the lens holding frame and the nut are formed from resin, the lens holding frame and the nut can be manufactured with low cost by injection molding or the like, and moreover the lens holding frame and the nut can be prevented from deformation or abrasion due to mutual contact of the lens holding frame and the nut, so that the durability of the lens holding frame and the nut can be improved.

Moreover, in the imaging device of this invention, the imaging device including the lens driving device as described above, wherein the lens is moved in the optical axis direction by the lens driving device to fulfill focusing or magnifying power change.

In the imaging device of this invention, the imaging device includes the above-described lens driving device and the lens is moved in the optical axis direction by the lens driving device to fulfill focusing or magnifying power change. Therefore, lens tilts due to the movement of the lens can be suppressed, making it achievable to provide an imaging device which has high-accuracy zoom and autofocus functions and moreover which is low in price and small in size.

Moreover, in the imaging device of one embodiment, the imaging device further comprising:

a mechanical shutter which is fixed to the lens holding frame and moved integrally with the lens holding frame; and a flexible printed circuit board which feeds power to the mechanical shutter and which is deformed along with movement of the lens holding frame.

In the imaging device of this embodiment, the imaging device includes the mechanical shutter which is moved integrally with the lens holding frame, and the flexible printed circuit board which is deformed along with movement of the lens holding frame. Therefore, even if the lens holding frame is moved integrally with the mechanical shutter, backlashes and tilts of the lens holding frame caused by the reaction force of the flexible printed circuit board can be suppressed, so that an imaging device having a high-accuracy moving mechanism can be realized.

Moreover, in the imaging device of one embodiment, the mutual contact portions of the lens holding frame and the nut are so formed as to give a preload in a direction opposite to that of a reaction force acting on the lens holding frame due to deformation of the flexible printed circuit board.

In the imaging device of this embodiment, the mutual contact portions of the lens holding frame and the nut are so formed as to give a preload in a direction opposite to that of a reaction force acting on the lens holding frame due to deformation of the flexible printed circuit board. Therefore, backlashes and tilts of the lens holding frame caused by the reaction force of the flexible printed circuit board can be suppressed with reliability.

Moreover, in the imaging device of one embodiment, the urging member is so placed that the urging force of the lens holding frame for the nut becomes increasingly stronger with increasing reaction force of the flexible printed circuit board.

In the imaging device of this embodiment, the urging member is so placed that the urging force of the lens holding frame for the nut becomes increasingly stronger with increasing reaction force of the flexible printed circuit board. Therefore, backlashes and tilts of the lens holding frame caused by the reaction force of the flexible printed circuit board can be suppressed with reliability.

According to the lens driving device of the invention, since the mutual contact portions of the lens holding frame and the nut are so formed that when the lens holding frame and the nut are brought into contact with each other by the urging member, an urging force acts on the lens holding frame in the optical axis direction and the orthogonal direction, the lens driving device is enabled to move the lens with high accuracy and moreover allows size reduction and cost reduction to be achieved.

Also, according to the imaging device of the invention, the imaging device includes the above-described lens driving device and the lens is moved in the optical axis direction by the lens driving device to fulfill focusing or magnifying power change. Thus, the imaging device is enabled to move the lens with high accuracy and moreover allows size reduction and cost reduction to be achieved.

DETAILED DESCRIPTION OF THE INVENTION

Hereinbelow, the present invention will be described in detail by way of embodiments thereof illustrated in the accompanying drawings.

Figure 1:
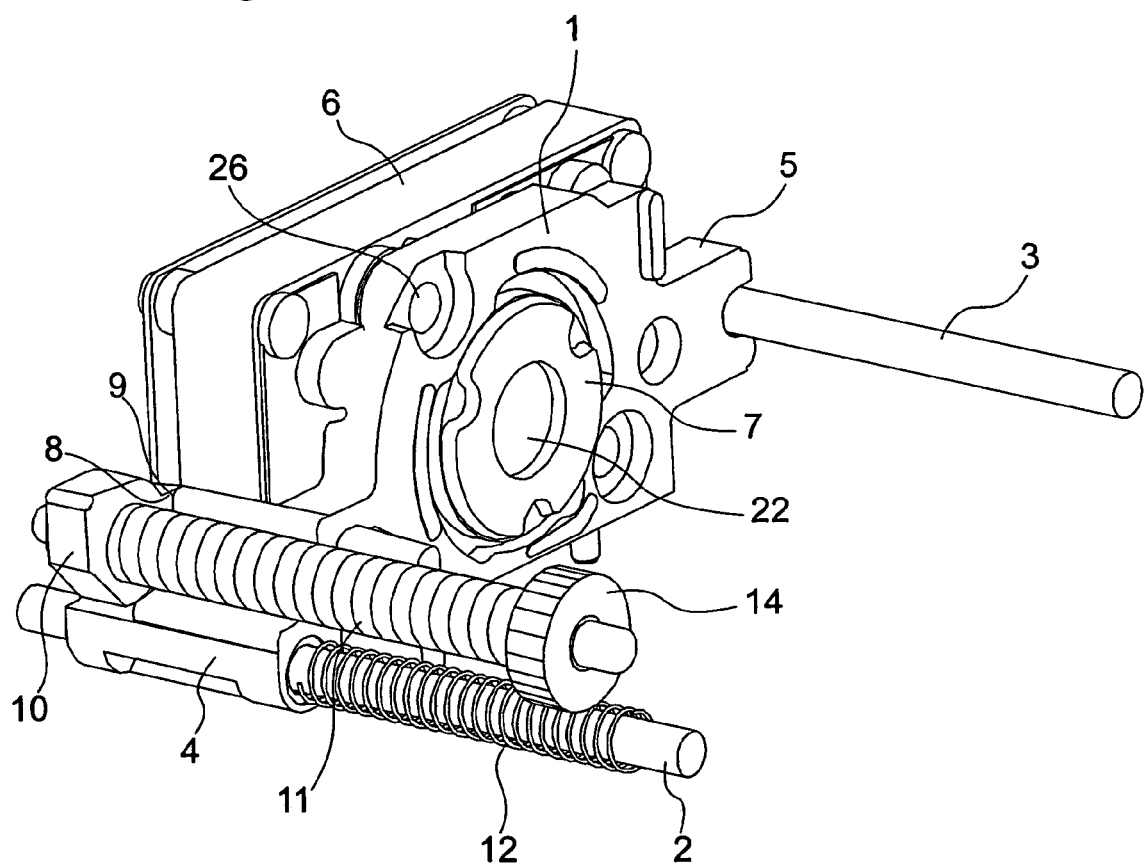
FIG. 1 is a perspective view showing an embodiment of the lens driving device of the invention.

FIG. 1 show a perspective view of an embodiment of the lens driving device of the invention. This lens driving device is to be used for an imaging device. This imaging device has first to fourth lenses as an image pickup optical system, and the first to fourth lenses are so arrayed that their optical axes are coincide with one another.

The second and third lenses are placed inside a casing. By the second and third lenses being moved in the optical axis direction, the image pickup optical system is subjected to a magnifying power change to an image-taking magnifying power (zooming) or focusing.

FIG. 1 illustrates the third lens 22 and a lens holding frame 1 for holding the third lens 22. The third lens 22 is fixed to the lens holding frame 1 via a barrel 7.

A mechanical shutter 6 for adjusting light quantity in response to a brightness of a subject is screwed and fixed to the lens holding frame 1 by a shutter fixing portion 26. The mechanical shutter 6 is moved in the optical axis direction along with the lens holding frame 1.

In the lens holding frame 1 are formed a bearing portion 4 into which a guide shaft for guiding the lens holding frame 1 in the optical axis direction is inserted, and a sub bearing portion 5 into which a sub shaft 3 for preventing the lens holding frame 1 from rotating is inserted. The bearing portion 4 has a circular hole portion into which the guide shaft 2 is inserted, while the sub bearing portion 5 has a U-shaped hole portion into which the sub bearing portion 5 is inserted.

In one portion of the lens holding frame 1 is formed a contact portion 9 which is to be brought into contact with a nut 10 that is a movable member for driving the lens holding frame 1 in the optical axis direction.

Figure 2:
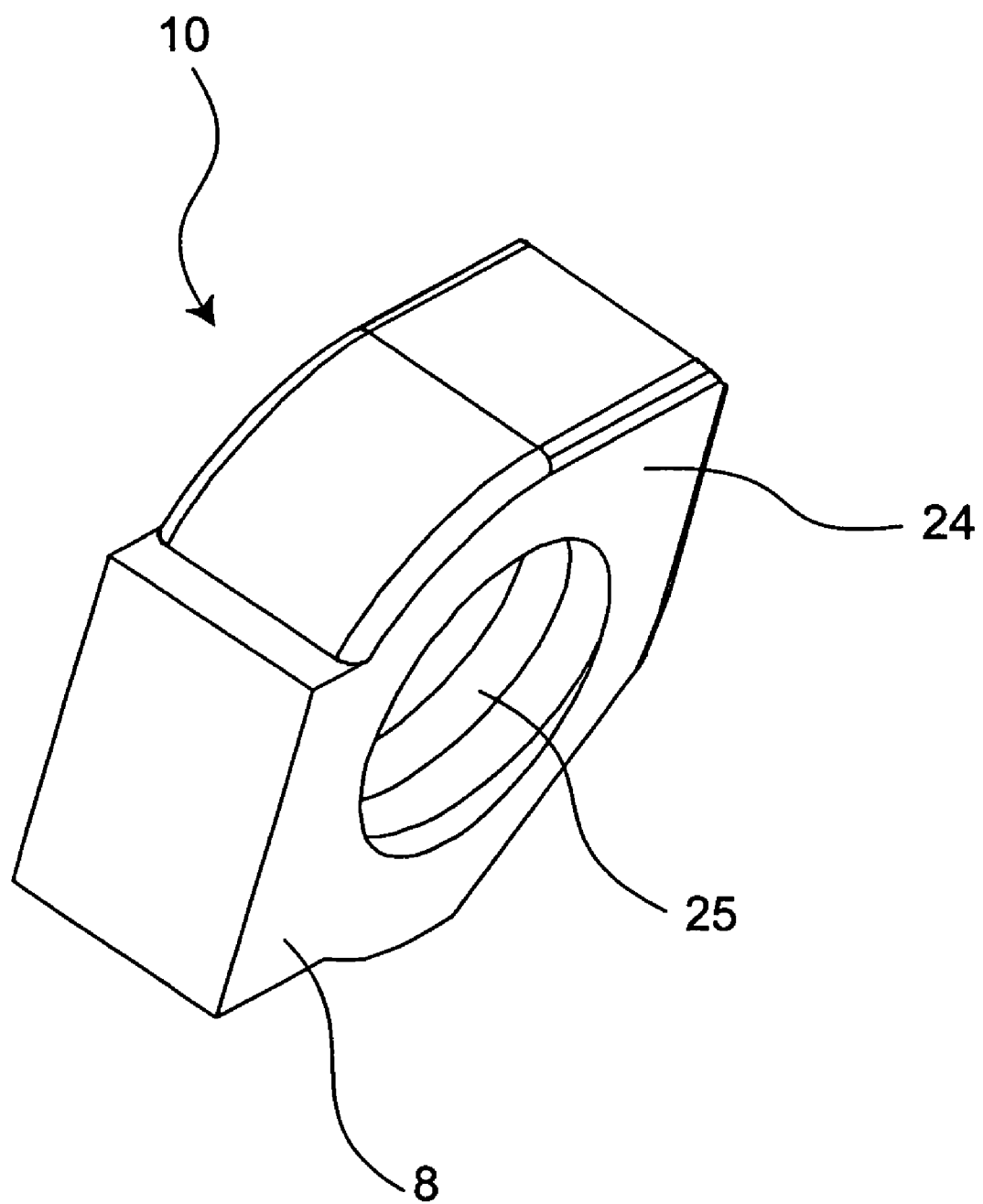
FIG. 2 is a perspective view showing a nut.

A female screw portion 25 to be screwed with a male screw portion of a lead screw 11, a detent portion 24, and a contact portion 8 to be brought into contact with the lens holding frame 1 are formed in the nut 10 as shown in FIGS. 1 and 2.

The detent portion 24 comes into contact with an unshown case portion so that the nut 10 is prevented from rotating. As a lead screw gear 14 is rotated by an unshown motor, the nut 10 is moved along the lead screw 11.

A coil spring 12 as an urging member is placed on the guide shaft 2. The lens holding frame 1 is urged toward the nut 10 by the coil spring 12, so that the contact portion 9 of the lens holding frame 1 is brought into contact with the contact portion 8 of the nut 10 in an urged state. As a result, while a backlash of the guide shaft 2 in the axial direction (thrust direction) is suppressed, the lens holding frame 1 is moved in the optical axis direction by the movement of the nut 10.

Figure 3:
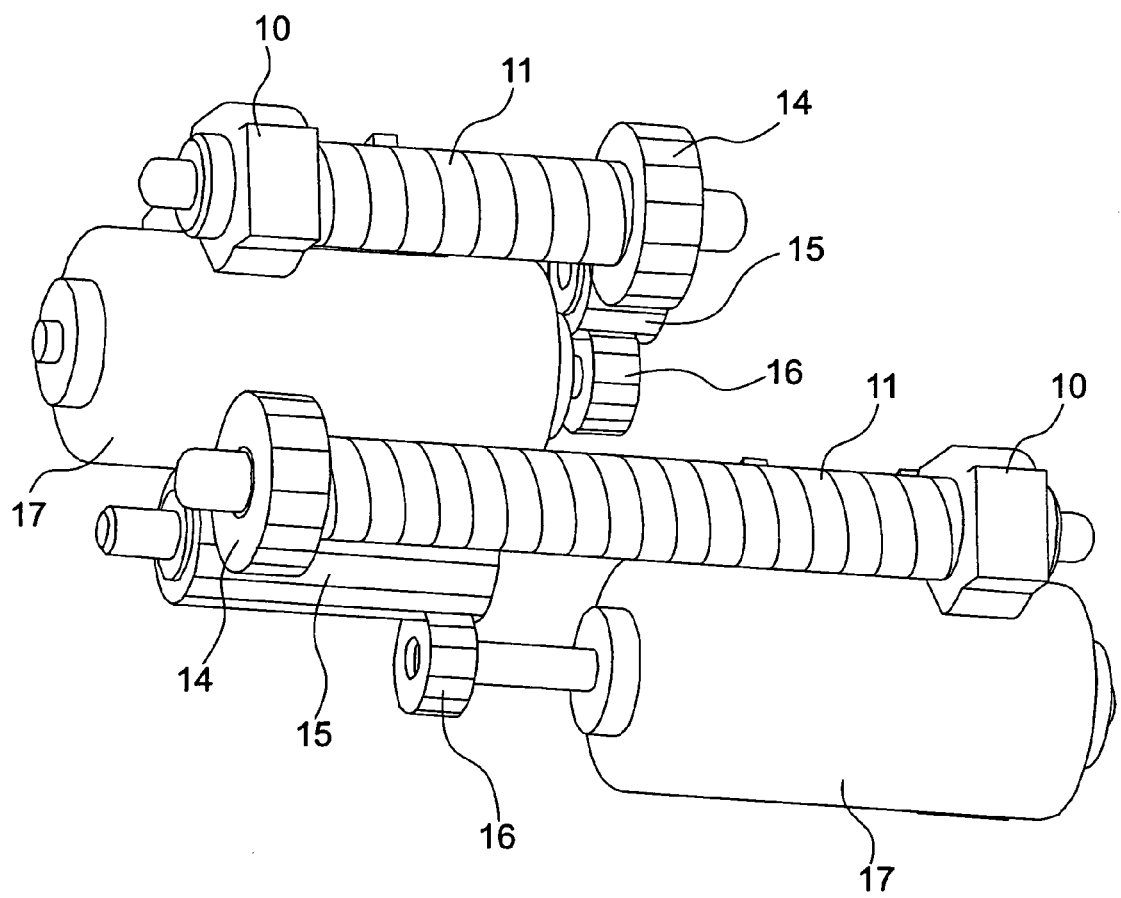
FIG. 3 is a perspective view showing a drive mechanism.

FIG. 3 shows a perspective view of a drive mechanism that drives the lens holding frame 1. This drive mechanism is constructed so as to drive two units of the lens holding frame 1. The drive mechanism has a motor 17 such as a stepping motor as a driving source, a motor pinion gear 16 fitted to the motor 17, a reduction gear 15, and a lead screw gear 14 fitted to the lead screw 11.

Then, rotation of the motor 17 is transmitted to the lead screw 11 via the motor pinion gear 16, the reduction gear 15, and the lead screw gear 14, by which the lead screw 11 is rotated, the nut 10 being thereby driven as described above. In addition, the individual members are optimized in their configuration, placement and the like in consideration of the move amount, necessary torque and space constraints of the lens holding frame 1.

Figure 4:
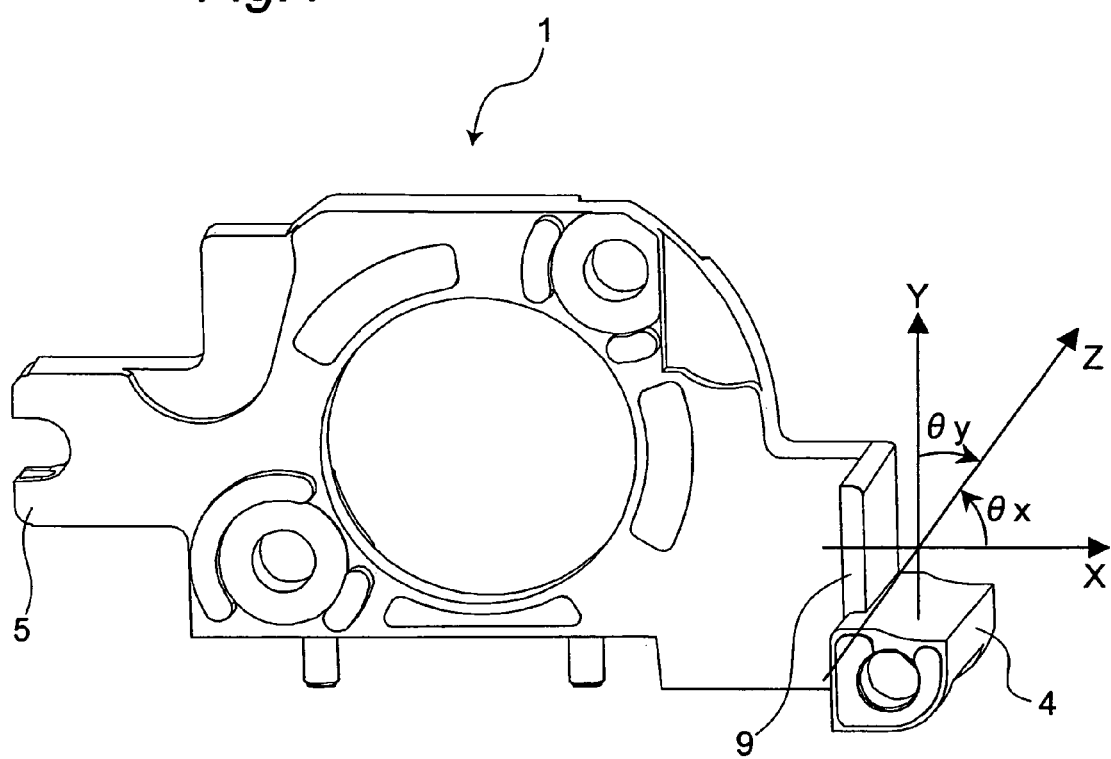
FIG. 4 is a perspective view showing a lens holding frame.

Next, the contact portion 9 of the lens holding frame 1, which is brought into contact with the nut 10, is explained. As shown in FIGS. 1 and 4, given an origin being a center of the nut 10, a Z direction being the axial direction (optical axis direction) of the lead screw 11, and X and Y directions being an orthogonal plane that orthogonally intersects the Z direction, then the contact portion 9 is formed longitudinally elongate, longer in the Y direction and shorter in the X direction and asymmetrical about the X and Y directions. It is noted that the X direction refers to a horizontal (or vertical) direction of an image to be picked up while the Y direction refers to a direction orthogonal to the X direction.

Also, the contact portion 9 is formed only on the negative side of the X direction. As a result of this, the coil spring 12, while urging the lens holding frame 1 toward the nut 10, is enabled to give not only a preload in the thrust direction (Z direction) but also a preload in the radial direction (X direction), so that backlashes in both thrust and radial directions can be suppressed by the single coil spring 12.

Figure 5:
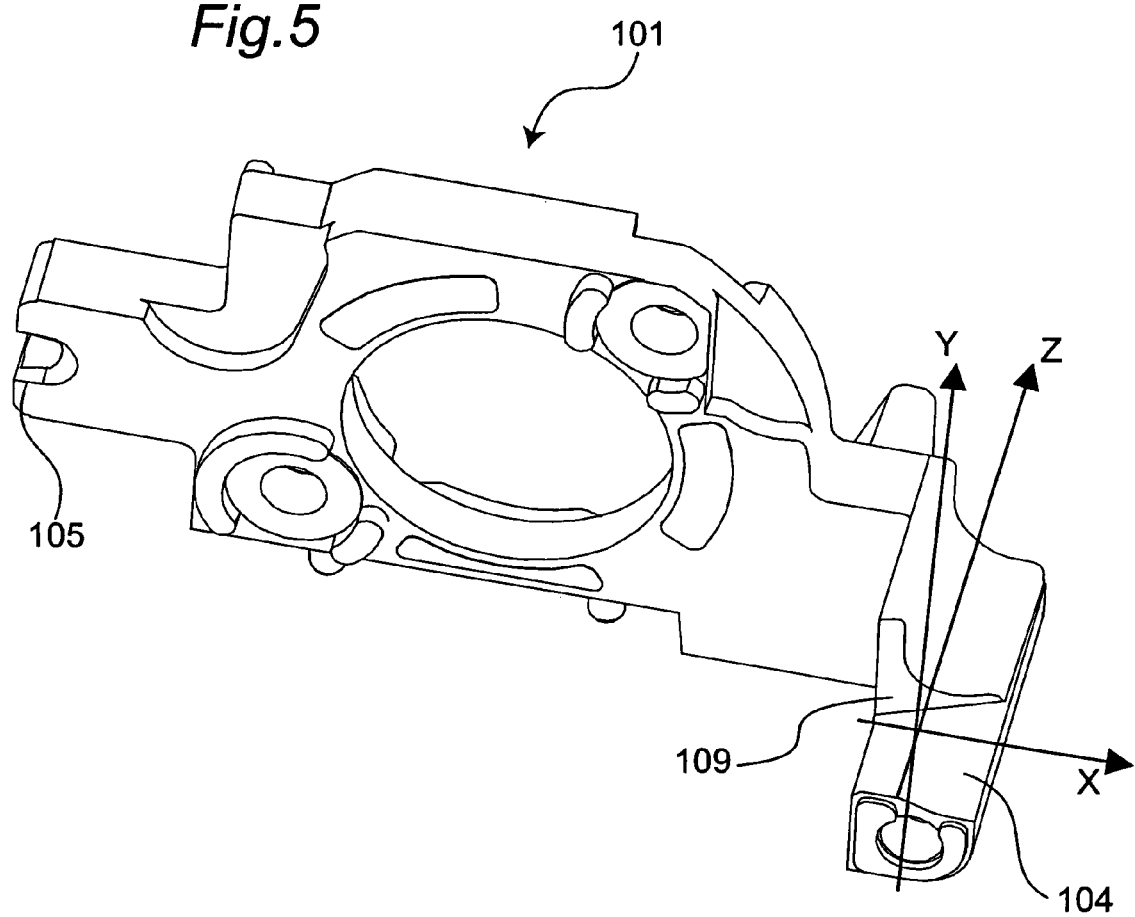
FIG. 5 is a perspective view showing another lens holding frame.

FIG. 5 shows another lens holding frame 101. A contact portion 109 of the lens holding frame 101 is so formed as to extend up to on the positive side of the X direction as well. The contact portion 109 has a sloped surface sloped with respect to an orthogonal plane (X-Y plane) that orthogonally intersects the optical axis direction (Z direction). In this state, the lens holding frame 1 is urged toward the nut 10 (see FIG. 1) by the coil spring 12 (see FIG. 1), by which the sloped surface of the contact portion 109 of the lens holding frame 101 and the contact portion 8 of the nut 10 are brought into contact with each other, so that the preload can be given also in the radial direction as in the case of FIG. 4. It is noted that a bearing portion 104 of the lens holding frame 101 is similar in construction to the bearing portion 4 of FIG. 4, while a sub bearing portion 105 of the lens holding frame 101 is similar in construction to the sub bearing portion 5 of FIG. 4.

In addition, the contact portion 9 of the lens holding frame 1 and the contact portion 8 of the nut 10 may also be formed into configurations other than those shown in FIGS. 4 and 5 on condition that when the contact portion 9 of the lens holding frame 1 and the contact portion 8 of the nut 10 are brought into contact with each other, the lens holding frame 1, while being urged by the coil spring 12 that acts in the thrust direction as shown in FIG. 1, has a preload acting also in the radial direction.

Now, if the contact portion 9 of the lens holding frame 1 has a projective configuration parallel to the X-Y plane as shown in FIG. 4, the contact portion 9, while being urged by the coil spring 12, is substantially linear-shaped. The configuration of the contact portion 9 may be determined so that the line of the linear shape falls within two quadrants out of the four quadrants of the X-Y plane with respect to the origin of coordinates. In other words, it is enough that the contact portion 8 of the nut 10 is present within a central angle range of 180° about the axis of the nut 10 assumed as the center while the contact portion 9 of the lens holding frame 1 comes into contact with the contact portion 8 of the nut 10 by a range within 180° out of the 360° outer periphery of the nut 10.

Meanwhile, in the case where the contact portion 9 of the lens holding frame 1 is sloped with respect to the X-Y plane as shown in FIG. 5, the contact portion 9 of the lens holding frame 1, while being urged by the coil spring 12, is brought into contact with the contact portion 8 of the nut 10 by a plane. A slope angle of the sloped surface of the contact portion 9 of the lens holding frame 1 is preferably set to more than a maximum tilt quantity between the guide shaft 2 and the bearing portion 4, which depends on a clearance between the guide shaft 2 and the bearing portion 4 as well as the span of the bearing portion 4. For instance, if the clearance is 20 µm maximum and the span of the bearing portion 4 is 5 mm, then the slope angle of the sloped surface of the contact portion 9 is preferably set to 13.7 min. or more.

FIGS. 4 and 5 show a construction in which a backlash in the thrust direction and the X-Z plane direction (a tilt of the lens holding frame 1 in a θx direction) can be suppressed. However, forming the contact portion 9 laterally elongated as an example also makes it possible to suppress a backlash in the Y-Z plane direction (a tilt of the lens holding frame 1 in a θy direction), and moreover placing the contact portion 9 along a diagonal direction in the X-Y plane further makes it possible to suppress backlashes in both directions (θx direction and θy direction). Preferably, the configuration of the contact portion 9 is optimized depending on the direction of the force acting on the lens holding frame 1 such as later-described reaction force of the FPC. More preferably, the contact portion 9 is so set as to be located in one quadrant out of the four quadrants of the X-Y plane for the purpose of giving a preload in both X and Y directions. In other representation, the contact portion 8 of the nut 10 is preferably so set as to be located within a central angle range of 90° about the axis of the nut 10 assumed as the center.

Although a case in which the preload is given in the radial direction by the configuration of the contact portion 9 of the lens holding frame 1 is shown in FIGS. 4 and 5, yet similar effects can be obtained also by the configuration of the contact portion 8 of the nut 10 from the same principle. This can be achieved when at least one of the contact portion 9 of the lens holding frame 1 and the contact portion 8 of the nut 10 is provided with a sloped surface that is sloped with respect to an orthogonal plane that orthogonally intersects the optical axis direction.

In this embodiment, there has been shown a placement that the nut 10 screwed at its entire periphery to the lead screw 11 is brought into contact with the lens holding frame 1 at a proximity to the lead screw 11. However, the effect can be obtained in the same principle even when the nut 10 is engaged with about a half periphery of the lead screw 11 and brought into contact with the lens holding frame 1 at a proximity to the guide shaft 2. In this case, the contact portion 9 may well be formed as in the above case by the coordinate system whose origin is at an axial center of the guide shaft 2.

Preferably, the lens holding frame 1 and the nut 10 are both formed from resin. For instance, POM or other like resin is used for the nut 10, and polycarbonate or other like resin is used for the lens holding frame 1. Thus, by forming the lens holding frame 1 and the nut 10 from resin, the lens holding frame 1 and the nut 10 can be prevented from damage or abrasion due to their contact, so that these members can be improved in durability and moreover manufactured simply with lower cost by injection molding or the like.

Figure 6:
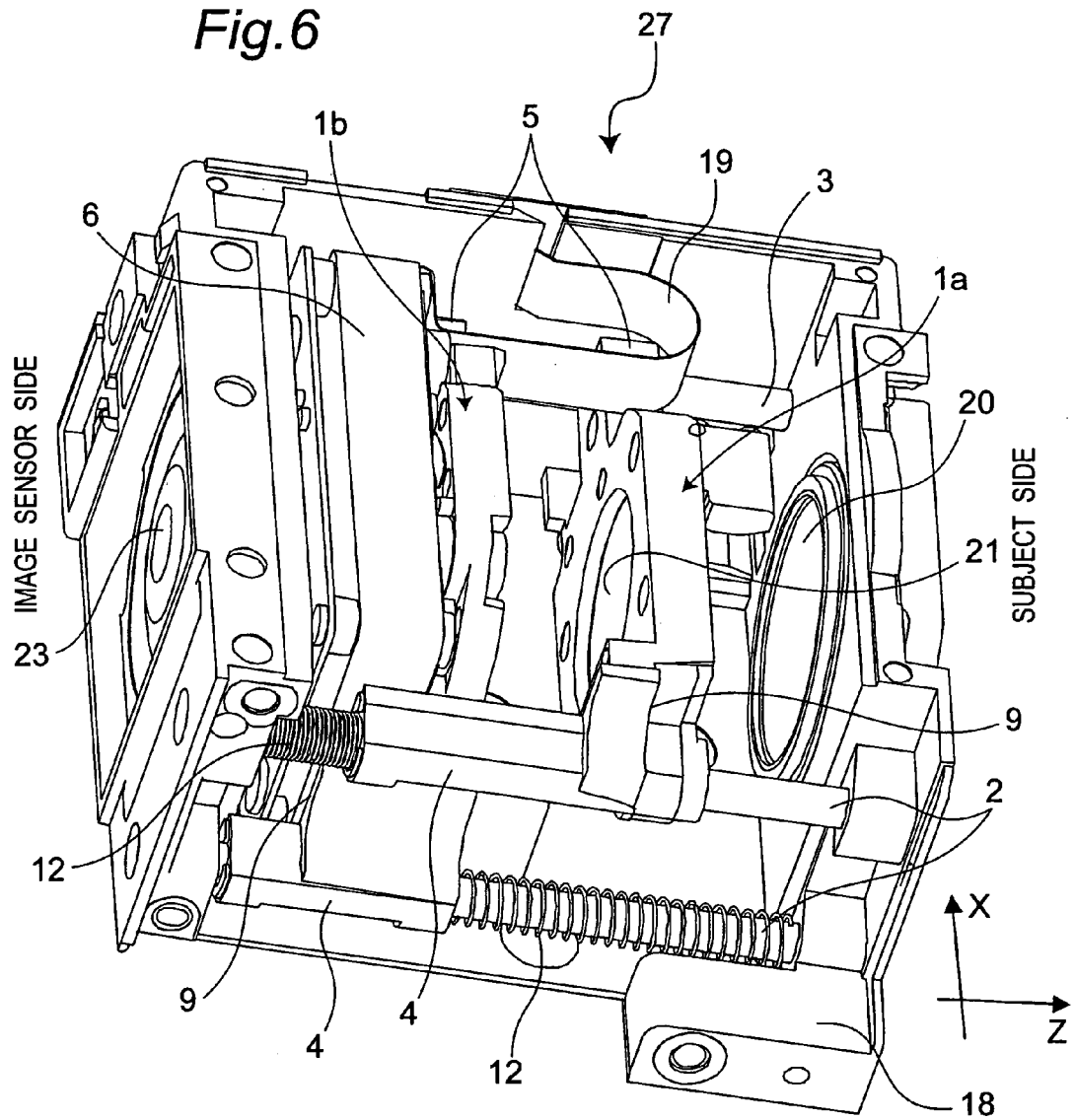
FIG. 6 is a perspective view showing an optical unit of the imaging device of the invention as well as showing a wide position of a third lens holding frame.
Figure 7:
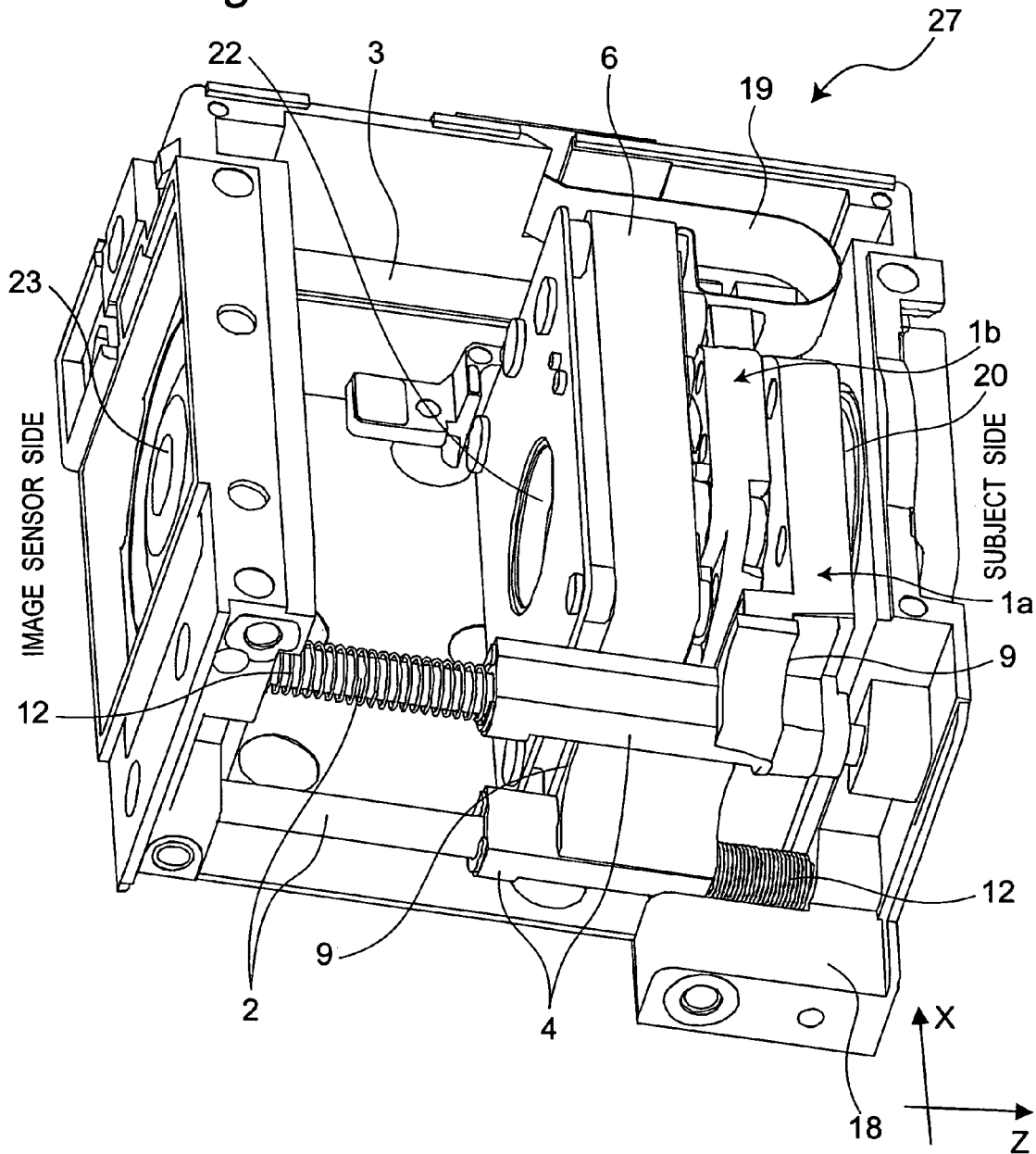
FIG. 7 is a perspective view showing an optical unit of the imaging device of the invention as well as showing a telescopic position of the third lens holding frame.

Next, FIGS. 6 and 7 show an embodiment of the imaging device using the lens driving device of the invention. FIG. 6 shows an optical unit 27 of the imaging device in a wide position, and FIG. 7 shows the optical unit 27 of the imaging device in a telescopic position. The driving device shown in FIG. 3 and image sensors such as CCDs or CMOSs are coupled to the optical unit 27, by which the imaging device is made up. In FIGS. 6 and 7, component members that have already been described in FIGS. 1 to 4 are designated by like reference numerals and their description is omitted.

This imaging device is composed of four lenses of a first lens 20, a second lens 21, a third lens 22 and a fourth lens 23. The first to fourth lenses 20, 21, 22, 23 are placed in this order from subject to image-sensor side so that their optical axes coincide with one another.

The first lens 20 and the fourth lens 23 are fixed to an optical base 18. The second lens 21 and the third lens 22 are fixed to a second lens holding frame 1a and a third lens holding frame 1b, respectively.

The second lens holding frame 1a and the third lens holding frame 1b can be moved in the optical axis direction by the above-described lens driving device, and performs zoom and autofocus functions. The second lens holding frame 1a and the third lens holding frame 1b are similar in construction to the lens holding frame 1 shown in FIG. 1.

A mechanical shutter 6 is fixed to the third lens holding frame 1b as in the lens holding frame 1 shown in FIG. 1. The mechanical shutter 6 is moved in the optical axis direction integrally with the third lens holding frame 1b.

The guide shaft 2 and the sub shaft 3 are inserted into the bearing portion 4 and the sub bearing portion 5 of the second lens holding frame 1a and the third lens holding frame 1b, respectively. Both ends of the guide shaft 2 and the sub shaft 3 are fixed to the optical base 18.

The coil spring 12 is placed between the bearing portions 4 of the second lens holding frame 1a and the third lens holding frame 1b and the wall surface of the optical base 18. An inner diameter portion of the coil spring 12 is insertionally fitted to the guide shaft 2.

The coil spring 12 is a compression coil spring (helical spring). When compressed, the coil spring 12 urges the lens holding frame 1 to the nut 10 shown in FIG. 1, thereby absorbing backlashes of the lens holding frame 1 in the thrust direction and the radial direction as described before.

With a compression coil spring used as the coil spring 12 and with the guide shaft 2 inserted therethrough, a preloading mechanism can be made up with a small space, and the coil spring 12 can be prevented from being released off due to dropping or other shocks, and moreover preload can be applied at a proximity of the guide shaft 2. Thus, the moment can be reduced, so that the lens holding frame 1 can be driven with low torque.

In the mechanical shutter 6 is provided a flexible printed circuit (FPC) board 19 for feeding power to a drive section that opens and closes a shutter blade or an ND filter (diaphragm) of the mechanical shutter 6.

As the third lens holding frame 1b moves on, the FPC 19 changes in configuration as shown in FIGS. 6 and 7. That is, a U-shaped portion of the FPC 19 changes in position.

In this imaging device as shown above, the FPC 19 causes a reaction force to act on the mechanical shutter 6 and the third lens holding frame 1b, the reaction force varying depending on the position (lens position) of the third lens holding frame 1b. As a result, depending on the lens position, the third lens holding frame 1b (third lens 22) incurs tilt variations in the radial direction, resulting in worsened optical characteristics. However, the imaging device of the invention, by virtue of its employing the above-described lens driving device, is enabled to suppress such tilts in the radial direction with a simple construction.

Also, preferably, the preload of the coil spring 12 is set so as to become larger at a lens position at which the reaction force of the FPC 19 becomes larger. For instance, as shown in FIGS. 6 and 7, when the third lens holding frame 1b is moved from the wide position (FIG. 6) to the telescopic position (FIG. 7), the reaction force acting from the FPC 19 to the third lens holding frame 1b becomes the largest at the telescopic position. Therefore, the coil spring 12 is preferably placed so that the coil spring 12 is compressed at the telescopic position to yield a large preload. That is, the coil spring 12 is so placed that the urging force of the third lens holding frame 1b for the nut 10 becomes increasingly stronger with increasing reaction force of the FPC 19. As a result, with such a placement, the preload acting on the nut 10 can be set low, so that the driving torque can be reduced as a side effect.

Further, in the imaging device shown in FIG. 6, the FPC 19 is fixed at a position away from the guide shaft 2 in the X direction, so that the reaction force from the FPC 19 results in an X-direction tilt (θx). Therefore, it is preferable to determine the configuration of the contact portion 9 that generates such a preload in the radial direction as can suppress X-direction tilts. For instance, when the contact portion 9 is formed into a configuration shown in FIG. 4 or 5, the θx-direction tilts can be suppressed, so that tilts due to the reaction force of the FPC 19 can more reliably be suppressed. When the FPC 19 is fixed at a position different from that of this embodiment, the configuration of the contact portion 9 may well be optimized according to the fixed position.

Figure 8:
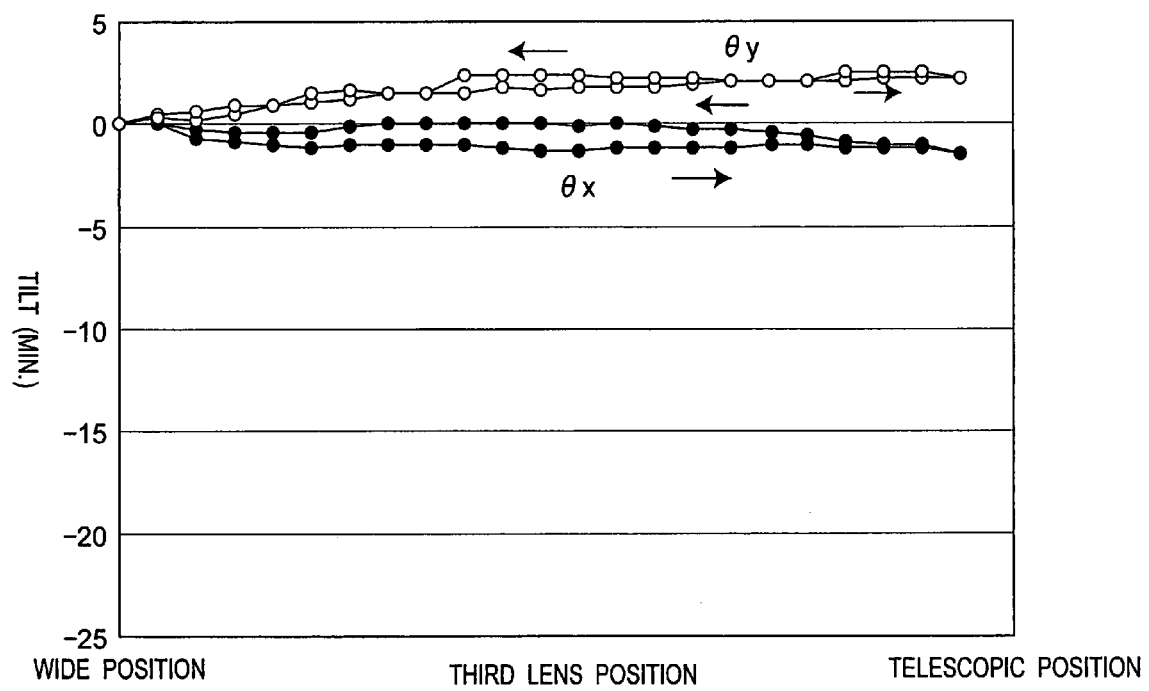
FIG. 8 is a graph showing measurement results of lens tilts in the lens driving device of the invention.

Next, results of an experiment that has demonstrated the effects of the lens driving device shown in this embodiment are shown. FIG. 8 shows results of measuring tilt quantities of the third lens 22 in the case where the lens driving device shown in FIGS. 1 and 4 was incorporated into the imaging device shown in FIG. 6 and where the third lens 22 was moved from the wide position to the telescopic position. In this case, the lens holding frame 1 of FIG. 4 is used as the third lens holding frame 1b to which the third lens 22 is fitted. Meanwhile, FIG. 9 shows results in the case of using the lens driving device of FIG. 10 as a comparative example.

Figure 9:
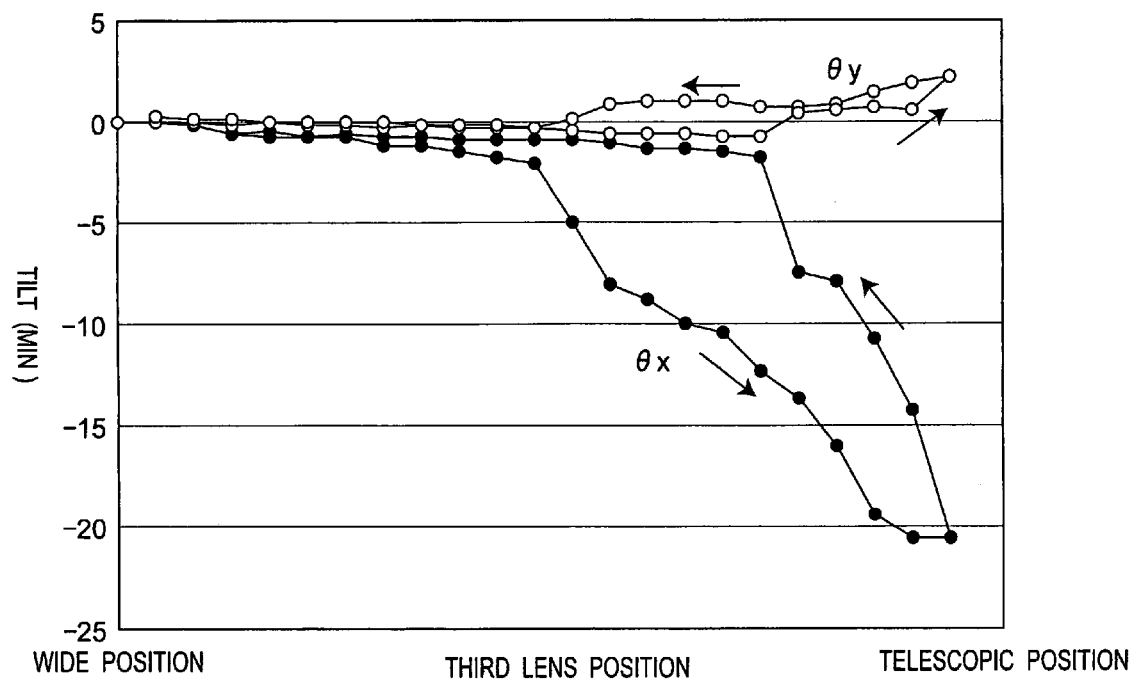
FIG. 9 is a graph showing measurement results of lens tilts in a lens driving device according to a comparative example.

In FIGS. 8 and 9, the horizontal axis represents the position of the third lens (moved from wide position to telescopic position) while the vertical axis represents measurement results of tilt quantity of the third lens by referencing the wide position. Tilt quantity was measured in two directions, the θx direction and the θy direction, shown in FIG. 4. The arrows indicate directions in which the third lens is moved.

Figure 10:
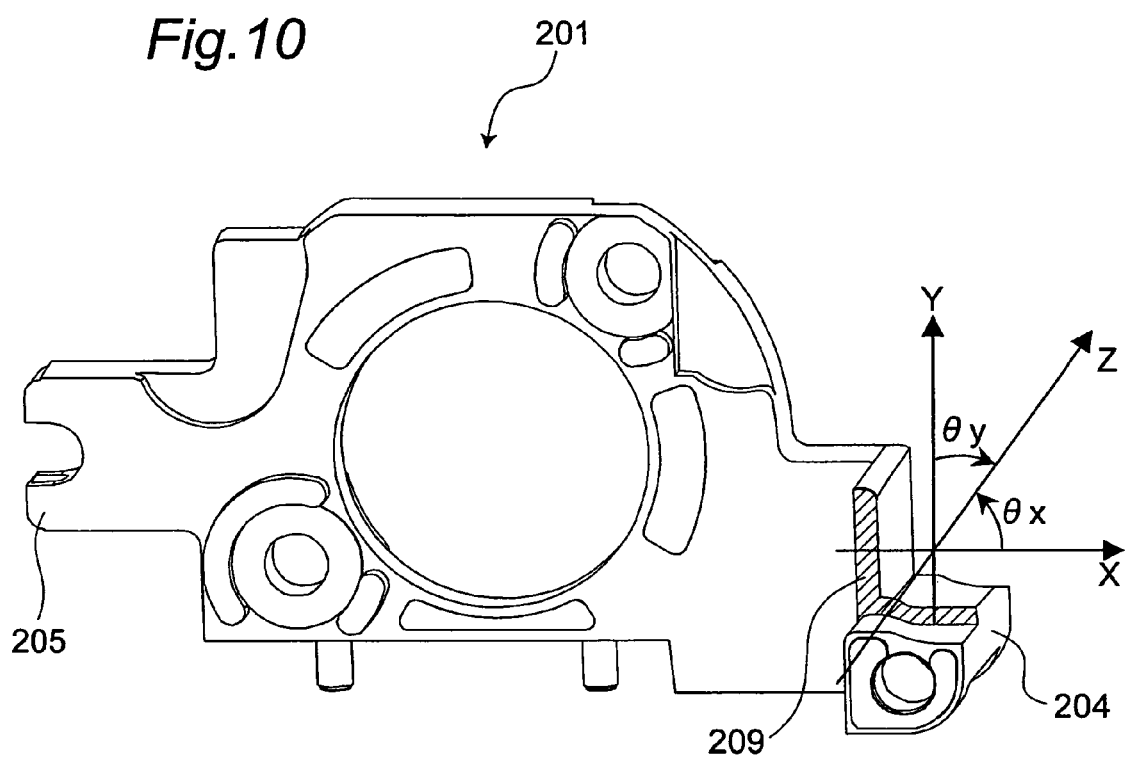
FIG. 10 is a perspective view showing a lens holding frame in a lens driving device as a comparative example.

In the lens driving device as the comparative example, as shown in FIG. 10, a contact portion 209 of the lens holding frame 201 is so formed as to come into contact with the contact portion 8 of the nut 10 shown in FIG. 1 on an orthogonal plane that intersects the optical axis direction, in which case no preload is generated in the radial direction by urgency exerted by the coil spring 12 shown in FIG. 1. That is, the contact portion 209 of the lens holding frame 201 is formed L-shaped as hatched in FIG. 10. In addition, a bearing portion 204 of the lens holding frame 201 is similar in construction to the bearing portion 4 of FIG. 4, and a sub bearing portion 205 of the lens holding frame 201 is similar in construction to the sub bearing portion 5 of FIG. 4.

As a result, in the case where the third lens 22 was fitted to the lens holding frame 201 of FIG. 10 so as to be used as the third lens holding frame 1b of FIG. 6, the tilt increased as the third lens 22 was moved from the wide position to the telescopic position, so that a maximum tilt of 20 min. was generated as shown in FIG. 9. The reason that values in the θx direction are larger than those in the θy direction is that the reaction force of the FPC 19 acts in the θx direction due to the placement of the FPC 19 shown in FIG. 6.

On the other hand, with the use of the lens driving device of the invention shown in FIG. 4, tilts in the θx direction were able to be reduced to large extents (a maximum of 3 min.), as shown in FIG. 8. This is because the contact portion 9 of the lens holding frame 1 is set to such a configuration that a preload is generated in the radial direction (θx direction in FIG. 8 in particular) by the coil spring 12 as described above. That is, the mutual contact portions 8 and 9 of the lens holding frame 1 and the nut 10, respectively, are so formed that the preload is given in a direction opposite to that of the reaction force acting on the lens holding frame 1 due to deformation of the FPC 19.

Also, the tilt becomes a maximum (i.e., the reaction force of the FPC becomes a maximum) at the telescopic position as shown in FIG. 8. However, since the coil spring 12 is so placed that the preload by the coil spring 12 becomes a maximum at the telescopic position as described before, tilts can be prevented with reliability.

As a result, there can be provided an effect that the torque necessary for driving of the lens holding frame 1 can be reduced, in contrast to the case in which the spring constant of the coil spring 12 is simply raised so as to overcome the reaction force of the FPC 19. For instance, assuming that the preload force of the coil spring 12 to overcome the maximum reaction force of the FPC 19 is 10 gf and the preload force necessary to maintain the posture of the third lens holding frame 1b is 5 gf, then setting the spring constant of the coil spring 12 so that the preload force becomes 5 gf when the third lens 22 is in the wide position while the preload force becomes 10 gf when the third lens 22 is in the telescopic position makes it achievable to prevent the tilts and minimize the preload force.

According to the lens driving device having the above-described constitution, since the mutual contact portions 8 and 9 of the lens holding frame 1 and the nut 10 are so formed that when the lens holding frame 1 and the nut 10 are brought into contact with each other by the urging member (the coil spring 12), an urging force acts on the lens holding frame 1 in the optical axis direction and the orthogonal direction, a preload can be given to the lens holding frame 1 in both the optical axis direction (thrust direction) and the orthogonal direction (radial direction) by the single urging member, so that backlashes of the lens holding frame 1 and lens tilts due to the drive of the lens holding frame 1 can be suppressed. Also, the lens driving device can be simplified in construction, allowing reduction of the parts count, size reduction and cost reduction to be achieved. Moreover, since backlashes of the lens holding frame 1 can be reduced, driving noise can be reduced.

Further, since at least one of the contact portion 9 of the lens holding frame 1 and the contact portion 8 of the nut 10 has the sloped surface sloped with respect to the orthogonal plane, the sloped surface is formed so as to be directed toward the optical axis direction and the orthogonal direction and a preload can be given to the lens holding frame 1 in both the optical axis direction and the orthogonal direction by the sloped surface. Thus, backlashes of the lens holding frame 1 and lens tilts can be suppressed with an even simpler construction.

The contact portion 8 of the nut 10 is present within a central angle range of 180° about the axis of the nut 10 assumed as the center. As a result, a preload can be given to the lens holding frame 1 in both the optical axis direction and the orthogonal direction by the contact portion 8 of the nut 10. Thus, backlashes of the lens holding frame 1 and lens tilts can be suppressed with an even simpler construction.

The urging member is implemented by the coil spring 12 having its inner diameter portion insertionally fitted to the guide shaft 2. Therefore, with the inner diameter portion of the coil spring 12 insertionally fitted to the guide shaft 2, the coil spring 12 can be set up in a small space, and prevented from being released off due to dropping or other shocks. Also, since the coil spring 12 gives the preload to the lens holding frame 1 at a proximity to the guide shaft 2, the moment can be reduced, so that the lens holding frame 1 can be driven with low torque.

Since the lens holding frame 1 and the nut 10 are formed from resin, the lens holding frame 1 and the nut 10 can be manufactured with low cost by injection molding or the like, the lens holding frame 1 and the nut 10 can be prevented from deformation or abrasion due to contact of the lens holding frame 1 and the nut 10 with each other, so that the durability of the lens holding frame 1 and the nut 10 can be improved.

According to the imaging device having the above-described constitution, since the imaging device includes the above-described lens driving device and the third lens 22 is moved in the optical axis direction by the lens driving device to fulfill focusing or magnifying power change, lens tilts due to the movement of the third lens 22 can be suppressed, making it achievable to provide an imaging device which has high-accuracy zoom and autofocus functions and moreover which is low in price and small in size.

Also, the imaging device includes the mechanical shutter 6 that is moved integrally with the lens holding frame 1 as well as the FPC 19 that is deformed along with the movement of the lens holding frame 1. Therefore, even if the lens holding frame 1 is moved integrally with the mechanical shutter 6, backlashes of the lens holding frame 1 and lens tilts caused by the reaction force of the FPC 19 can be suppressed, so that an imaging device having a high-accuracy moving mechanism can be realized.

Also, since the mutual contact portions 8 and 9 of the lens holding frame 1 and the nut 10 are so formed that the preload is given in a direction opposite to that of the reaction force acting on the lens holding frame 1 due to deformation of the FPC 19. Therefore, backlashes and tilts of the lens holding frame 1 caused by the reaction force of the FPC 19 can be suppressed with reliability.

Further, the coil spring 12 is so placed that the urging force of the lens holding frame 1 for the nut 10 becomes increasingly stronger with increasing reaction force of the FPC 19. Therefore, backlashes and tilts of the lens holding frame 1 caused by the reaction force of the FPC 19 can be suppressed with reliability.

In addition, the present invention is not limited to the above-described embodiments. For instance, the lens driving device may also be utilized for imaging devices having different optical systems. The urging member may also be implemented by a plate spring, a clip spring or the like. Further, other than a compression coil spring, the coil spring 12 may also be an extension coil spring, in which case the extension coil spring is located on one side of the lens holding frame 1 opposite to the side on which the compression coil spring is provided, with reference to FIG. 1.

The invention claimed is:

1. A lens driving device comprising:
a lens holding frame for holding a lens;
a guide shaft for guiding the lens holding frame in an optical axis direction;
a lead screw which is rotated by a driving source;
a nut which is engaged with the lead screw to transmit driving force of the driving source to the lens holding frame so that the lens holding frame is moved in the optical axis direction; and
an urging member for urging the lens holding frame toward the nut so that the lens holding frame is put into contact with the nut, wherein
the urging member is a coil spring,
an inner diameter portion of the coil spring is insertionally fitted to the guide shaft, and
mutual contact portions of the lens holding frame and the nut are so formed that when the lens holding frame and the nut are brought into contact with each other by the urging member, an urging force acts on the lens holding frame in the optical axis direction and in an orthogonal direction that orthogonally intersects the optical axis direction.

2. The lens driving device as claimed in claim 1, wherein at least one of the contact portion of the lens holding frame and the contact portion of the nut has a sloped surface sloped with respect to an orthogonal plane that orthogonally intersects the optical axis direction.

3. The lens driving device as claimed in claim 1, wherein the contact portion of the nut is present within a central angle range of 180° about an axis of the nut assumed as the center.

4. The lens driving device as claimed in claim 1, wherein the lens holding frame and the nut are formed from resin.

5. An imaging device including the lens driving device as defined in claim 1,
wherein
the lens is moved in the optical axis direction by the lens driving device to fulfill focusing or magnifying power change.

6. The imaging device as claimed in claim 5, further comprising:
a mechanical shutter which is fixed to the lens holding frame and moved integrally with the lens holding frame; and
a flexible printed circuit board which feeds power to the mechanical shutter and which is deformed along with movement of the lens holding frame.

7. The imaging device as claimed in claim 6, wherein the mutual contact portions of the lens holding frame and the nut are so formed as to give a preload in a direction opposite to that of a reaction force acting on the lens holding frame due to deformation of the flexible printed circuit board.

8. The imaging device as claimed in claim 7, wherein the urging member is so placed that the urging force of the lens holding frame for the nut becomes increasingly stronger with increasing reaction force of the flexible printed circuit board.

* * * * *